3,277,707
FLUID FLOW METER
Hans Egon Rödel, Sipplingen (Bodensee), Germany, assignor to Bodenseewerk Perkin-Elmer & Co., G.m.b.H., Uberlingen (Bodensee), Germany
Filed July 15, 1963, Ser. No. 294,977
Claims priority, application Germany, July 24, 1962, B 68,156
2 Claims. (Cl. 73—194)

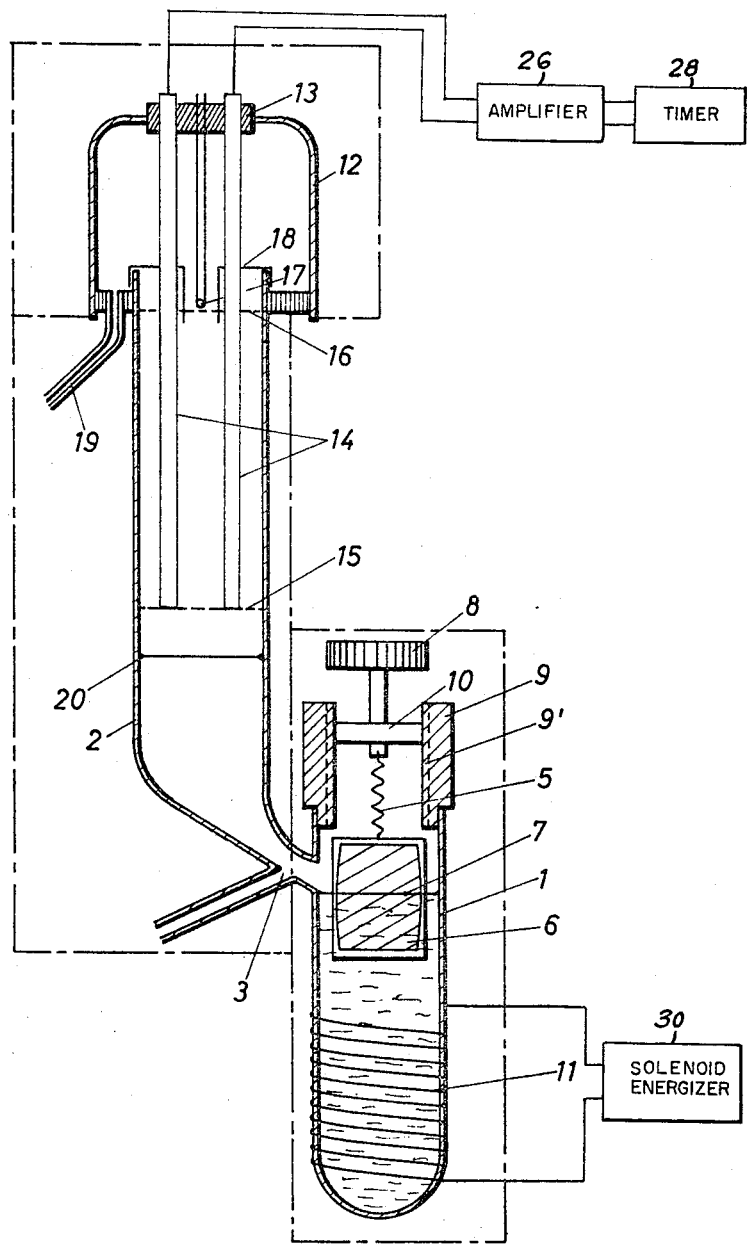

The present invention relates to apparatus for measuring the flow velocity of a fluid. Such apparatus is particularly useful in the field of gas chromatography where accurate measurements of the flow velocity of the carrier gas are necessary.

Presently known techniques for measuring the flow velocity of gas involve the introduction of a liquid into the gas stream to develop a bubble or liquid film. The bubble is caused to travel along a path of known length at the velocity of the gas. As the bubble passes the starting point of the path, the operator starts a stop watch and when the bubble passes the end of the path the stop watch is stopped. By knowing the length of the path and measuring the time required for the bubble to travel the length of the path, the velocity of the bubble or the velocity of the gas may be computed.

Such measurements have been found to be inaccurate. Part of the inaccuracy is due to the fact that the border zone of the bubble or liquid film is more or less thickened due to surface tension. This thickness in the border zone obviously has an effect on the time at which the stop watch is started and stopped. Additional inaccuracies are due to the human reaction time in operating the stop watch.

It is an object of the present invention to provide new and improved apparatus for measuring the flow velocity of fluids.

It is another object of the present invention to provide apparatus for measuring the flow velocity of gases which is not subject to the aforementioned shortcomings and disadvantages.

Apparatus for measuring flow velocity of a fluid constructed in accordance with the present invention comprises means for introducing a detectable component into the fluid flow to move with the fluid at the velocity of the fluid and first sensing means for developing a first control effect when the detectable component passes the beginning of a measured path. The apparatus further includes second sensing means for developing a second control effect when the detectable component passes the end of the measured path and timing means responsive to the first and second sensing means for developing a measurement of the time required for the detectable component to move from the beginning of the measured path to the end of the measured path.

For a better understanding of the present invention, together with other and further objects thereof, reference is had to the following description, taken in connection with the accompanying drawing, and its scope will be pointed out in the appended claims.

Referring to the drawing there is shown apparatus for measuring the flow velocity of gases constructed in accordance with the present invention.

*Description and operation of the invention*

Referring to the drawing, one embodiment of the apparatus of the invention includes a cylindrical measuring chamber 2 having a downward taper at its lower end. Chamber 2 is in open communication with a cylindrical liquid holding receptacle 1. The gas flow, on which the velocity measurement is to be made, is supplied through a gas flow supply line 4 and through an opening 3 in the tapered portion of the measuring chamber 2 near the point at which chamber 2 is connected to the liquid holding receptacle 1.

The liquid holding receptacle 1 is one part of the apparatus which serves to introduce a detectable component into the gas flow. Specifically, this component is in the form of a bubble or liquid film which is caused to move with the gas and at the same velocity. A body 6, of ferromagnetic material, suspended on a spiral spring 5, is partially immersed in the liquid in the liquid holding receptacle 1 in such a way that the liquid level 7 is below the opening 3. The spiral spring 5 is fixed to a cross member 10 which may be screwed, by means of a set screw 8, into or out of a thread 9' cut into the head portion 9 of the liquid holding receptacle 1. A solenoid coil 11 is wound around the liquid holding receptacle 1.

A cap 12 is mounted on and sealed to the measuring chamber 2. Two parallel bar electrodes 14 are held in an insulating head piece 13 of the cap 12. Electrodes 14 define a measured path over which the bubble, to be introduced into the gas flow, will be caused to travel. In particular, the lower ends of the electrodes 14 correspond to the beginning of the measured path while points 16 on the electrodes correspond to the end of the measured path. A filament 17, positioned between the bar electrodes 14 and held by head piece 13, is arranged to have its lower end aligned with points 16 on the bar electrodes. Screen plates 18 are arranged between the bar electrodes 14 and the filament 17. A gas flow-off line 19 is connected to the bottom of cap 12.

The bar electrodes 14 are connected to suitable time measuring apparatus (not shown) capable of indicating the amount of time required for the liquid film or bubble to move from the beginning of the measured path, namely, points 15 to the end of the measured path, namely, points 16. Such time measuring apparatus is preferably an electronic circuit of standard design and construction.

In the operation of the apparatus of the invention, the liquid level 7 is set by means of an adjustment of the set screw 8 which changes the amount of immersion of the ferromagnetic body 6. When the solenoid coil 11 is excited by means 30, the body 6 is attracted and moves downward, thereby raising the liquid level 7 so as to just close off the opening 3 of the gas flow supply line 4. A small quantity of liquid is broken away by the gas flow and is carried along as a bubble or liquid film 20 by the gas flow into the measuring chamber 1. The bubble or liquid film, so developed, travels at the velocity of the gas which is being measured. As soon as the liquid film 20 reaches the beginning of the measured path at points 15, a connection is effected between the two bar electrodes 14 by the film. The time measuring apparatus 26, 28 is so designed as to respond to this circuit closure. This connection between the bar electrodes 14 activates the time measuring apparatus and causes the commencement of the time count. The time measuring apparatus remains active until the liquid film 20 reaches the end of the measured path at points 16 at which time the film is broken due to the presence of filment 17. By breaking the liquid film 20, the connection between the bar electrodes 14 is also broken. This opening in the circuitry is effective to deactivate the time measuring apparatus and indicates that the liquid film 20 has reached the end of the measured path. Since the length of the measured path is known, the time measuring apparatus may be directly calibrated in units of flow velocity.

The gas and the remainder of the liquid film 20 flow off through flow-off line 19. After the time measuring apparatus is reset and the solenoid coil 11 is again excited, the measurement just made may be repeated. The set screw 8 makes possible the readjustment of liquid level 7.

It is obvious from the foregoing that not only is human reaction time eliminated from the measurement being made, but the influence of the varying thickness of the border zone is avoided since the contact between the liquid film and the bar electrodes is effected in an accurate and reproducible manner.

While there has been described what is at present considered to be a preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In fluid flow measuring apparatus, means for introducing an electrically conductive liquid body into said fluid flow to move with said fluid and at substantially the same velocity as said fluid along a predetermined length path,
a normally open electrical circuit, sensing means including elongated plural electrode means extending in the direction of flow of said fluid for said predetermined path length for defining the beginning and end of said path and adapted for electrical contact with said liquid body for closing said circuit when said liquid body reaches the beginning of said path and means for opening said circuit when said liquid body reaches the end of said path,
and timing means responsive to the opening and closing of said circuit for developing a measurement which is a function of the time required for said liquid body to move from said beginning of said path to said end of said path.

2. Apparatus for measuring the flow velocity of a gas comprising:
a measuring chamber having a pair of elongated electrodes spaced apart along their lengths, said electrodes having opposing portions which define a measured path and between which said gas flows along said path starting at one end of each of said electrodes which is at one end of said path,
an electrical circuit which includes said pair of electrodes and which is closed except for a normally open connection between said electrodes,
means for introducing a liquid into said gas flow to develop an electrically conductive liquid film which moves with said gas and at substantially the same velocity as said gas to connect said electrodes electrically and close said circuit when said film reaches said one end of said electrodes,
means located at the other end of said path for destroying said film when said film reaches said other end of said path thereby breaking said electrical circuit,
and timing means responsive to said circuit closure for commencing a measurement which is a function of the time required for said film to move from said one end of said path to said other end of said path and responsive to said breaking of said circuit for stopping said measurement.

References Cited by the Examiner

UNITED STATES PATENTS

| 1,616,481 | 2/1927 | Allen | 73—194 |
| 2,353,382 | 7/1944 | Barrett | 73—194 X |
| 2,829,518 | 4/1958 | Rumble et al. | 73—194 |

FOREIGN PATENTS

| 512,388 | 1/1955 | Italy. |

OTHER REFERENCES

"Soap Film Calibrators," by Gooderham, in Journal of the Society of Chemical Industry, volume 63–64, November 1944, pages 351–352, 73–194.

RICHARD C. QUEISSER, *Primary Examiner.*

E. D. GILHOOLY, *Assistant Examiner.*